Figure 1:
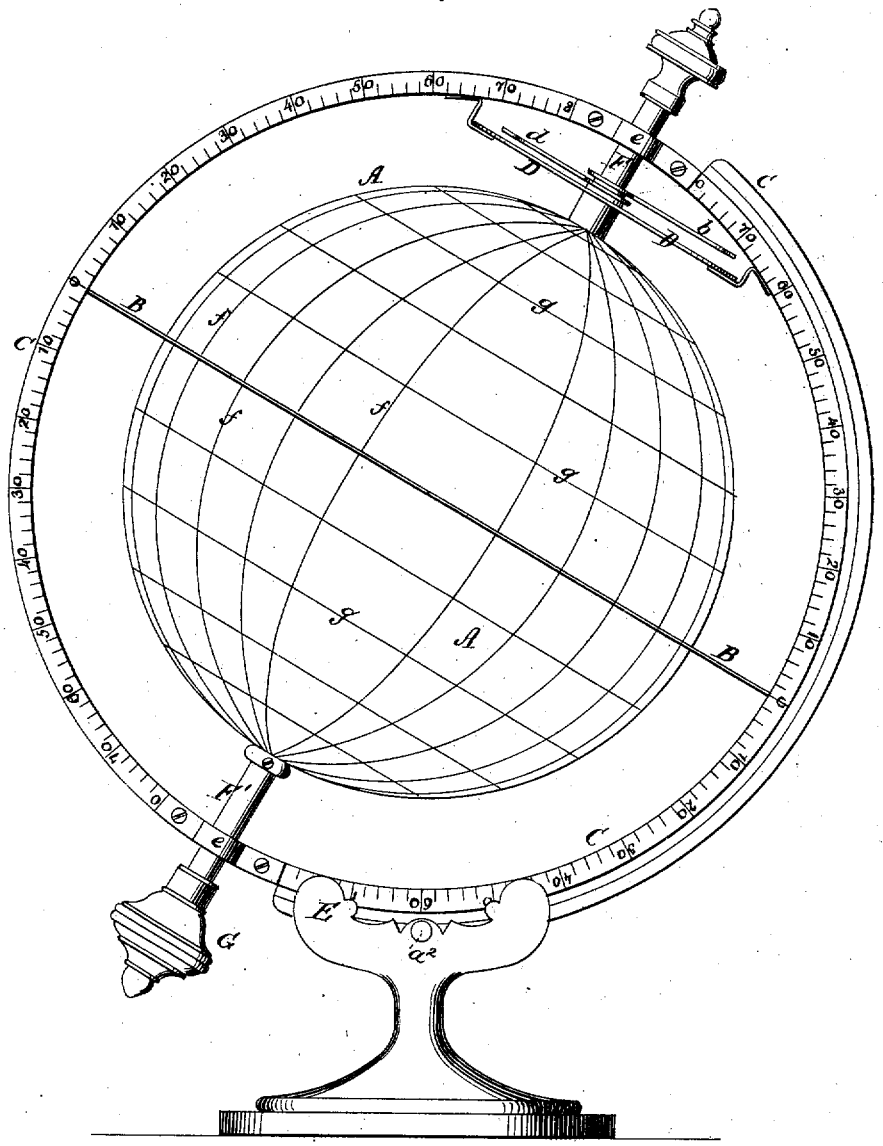

L. P. JUVET.
Time-Globe.

No. 8,666. Reissued April 8, 1879.

*Witnesses:*
E. Wolff.
Jacob Felbel

*Inventor:*
L. P. Juvet
By atty.
J. N. McIntire

N. PETERS, PHOTO-LITHOGRAPHER, WASHINGTON, D. C.

L. P. JUVET.

Time-Globe.

No. 8,666. Reissued April 8, 1879.

Witnesses:

E. Wolff.

Jacob Felbel

Inventor:

L. P. Juvet

By atty.

L. N. McPartlin

N. PETERS, PHOTO-LITHOGRAPHER, WASHINGTON, D. C.

L. P. JUVET.
Time-Globe.
No. 8,666. Reissued April 8, 1879.
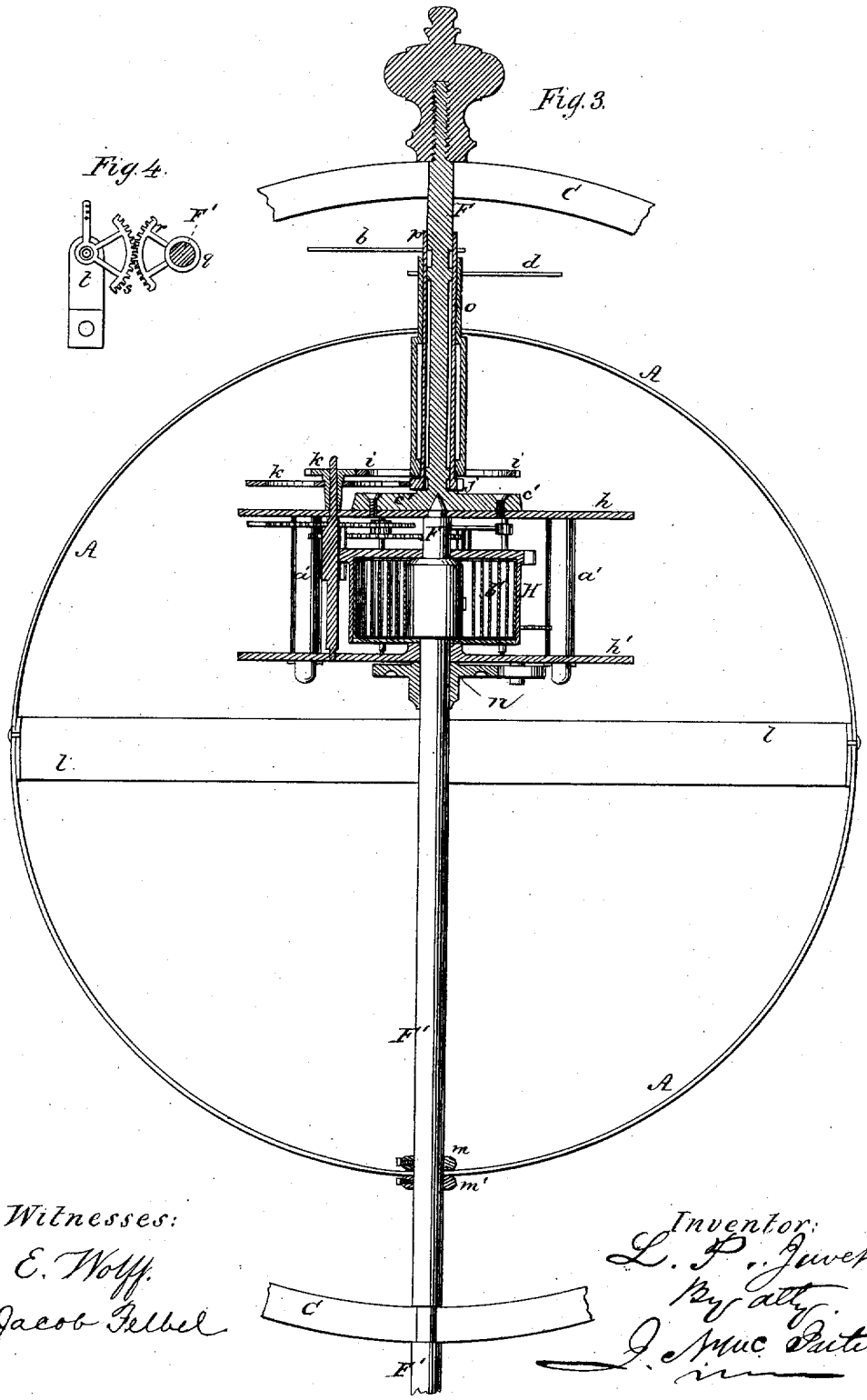
Witnesses:
E. Wolff.
Jacob Felbel
Inventor:
L. P. Juvet
By atty
J. Muc Paire
N. PETERS, PHOTO-LITHOGRAPHER, WASHINGTON, D. C.

UNITED STATES PATENT OFFICE.

LOUIS PAUL JUVET, OF GLENS FALLS, NEW YORK.

IMPROVEMENT IN TIME-GLOBES.

Specification forming part of Letters Patent No. 64,989, dated May 21, 1867; Reissue No. 8,666, dated April 8, 1879; application filed March 6, 1879.

*To all whom it may concern:*

Be it known that I, LOUIS PAUL JUVET, of Glens Falls, in the county of Warren and State of New York, have invented certain new and useful Improvements in Time-Globes; and I do hereby declare the following to be a full, clear, and exact description thereof, reference being had to the accompanying drawings, making part of this specification, and to the letters of reference marked thereon.

Previous to my invention time-globes have been made with the clock-work adapted to rotate the globe arranged, in some cases, exterior to, and in other cases wholly within, the said globe, and with an equatorial dial supported by and within the meridian-ring, in which latter was mounted, in suitable bearings, the polar shaft or axis supporting the globe; and in some such prior contrivances there has been provided, in addition to the equatorial dial, a smaller dial, located on or in the surface of the globe, and arranged concentrically with the axis of motion of the latter, so that, by means of a pointer attached to the globe at its equatorial circle and moving in close proximity to the equatorial dial, and a stationary pointer attached to the meridian-ring at the axis of rotation of the globe and arranged in close proximity to the moving dial located on the surface of said globe, two concentric dials were presented for the observation of time. But in none of such prior contrivances, so far as I know, were two dials employed in any manner that rendered the apparatus capable of indicating both the true and mean time at places of different longitudes.

My invention has for one of its objects to provide a time-globe which shall embrace the capacity just alluded to, and has for a further object the production of such a contrivance in a form simple and economic of manufacture and desirable in its practical operations.

To these ends and objects my invention consists, first, in the use, in connection with the globe and its equatorial dial, of a supplemental stationary dial, arranged concentrically to the equatorial dial, and provided with suitable hands moved by clock-work, so that by means of these devices not only the true time at various places on the surface of the globe, but also the mean or clock time at the place of use of the apparatus, may be readily observed; second, in a novel construction of the shaft or axis of the globe in two parts lengthwise, and a peculiar arrangement of devices combined therewith in a time-globe, having the clock-work or mechanism wholly within the globe.

To enable those skilled in the art to make and use my invention, I will proceed to more fully describe its construction and operation, referring by letters to the accompanying drawings, in which—

Figure 2:
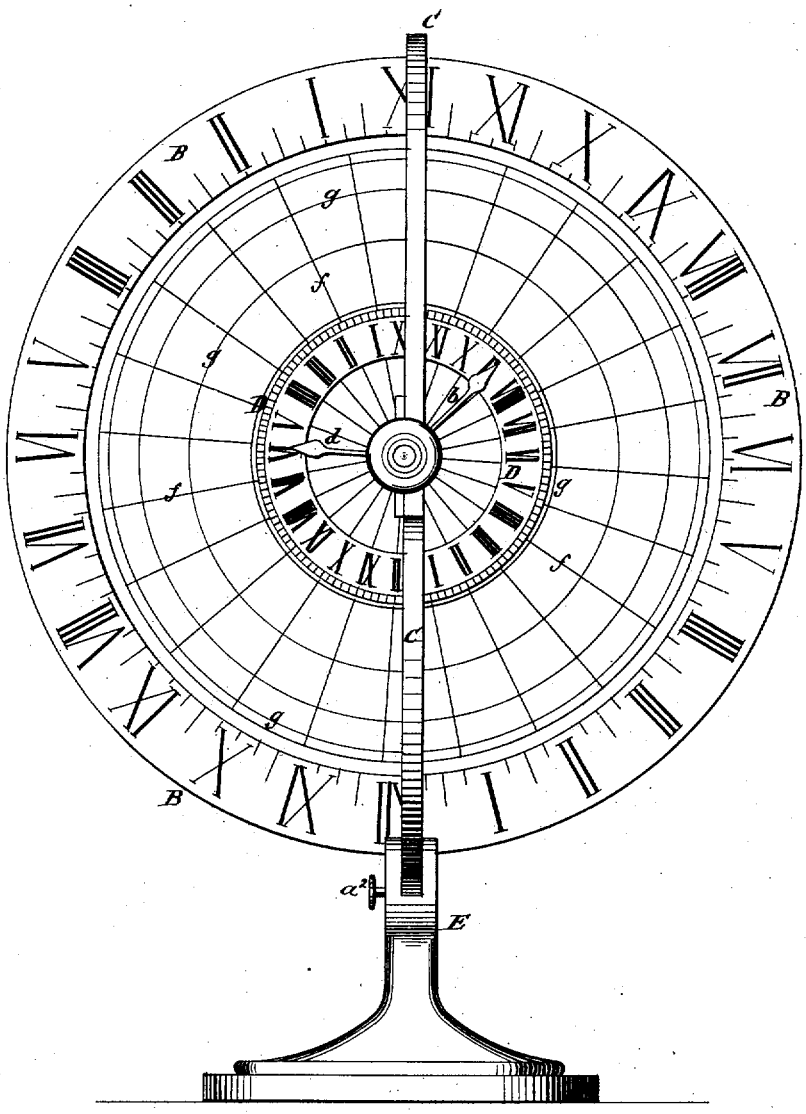

Figure 1 is a side elevation of a time-globe embracing the several features of my invention. Fig. 2 is a front view of the same, with the meridian-ring adjusted to bring the axis of the globe in a horizontal position. Fig. 3 is an axial section, showing the clock-work of the globe; and Fig. 4 is a detail view of a regulator attachment.

In the several figures the same part will be found designated by the same letter.

A represents a hollow terrestrial globe composed of two hemispherical sections properly fitted and secured together at the equatorial line, as will be presently more fully described. B is the equatorial dial, and C is the meridian-ring which supports it, and also supports the axial shaft of the globe and a supplemental dial, D, arranged near one of the poles and concentrically to the equatorial dial B.

The meridian-ring C is arranged, as usual, to slide in the upper part of the standard E, in which it is secured in the ordinary manner by a set-screw, $a^2$; and said ring has its surface marked off into degrees in a well-known manner, to facilitate, by adjustment of said ring in said standard E, the placement of the globe with its axis at any desired degree of inclination to the horizon.

*b* and *d* are, respectively, the minute and hour hands of the supplemental dial D, and are operated by clock-work arranged or located, by preference, within the globe A, said hands indicating the time on dial D the same as on the dial of a clock or watch.

As the globe is arranged to revolve in the direction of the earth's movement, and as I have, by preference, shown the dial D located at the North Pole, the hands *b* and *d* are arranged to move to the left.

I have shown the dial D as marked or numbered from one to twelve twice, since the globe revolves once in twenty-four hours; but said dial D may be subdivided into twelve hours only instead of twenty-four, at the option of the constructer.

F F′ represent the axial shaft of the globe. G is a thumb-piece attached to the lower end of the portion F′, by which to turn the part F′, to effect the winding up of the chronometer inside of the globe.

The compound axis or shaft F F′ of the globe is supported by the meridian-ring C, through the medium of two axial boxes, *e e*, as clearly shown.

The lines *f* on the globe indicate the parallels of longitude, and the lines marked *g* those of latitude.

The works employed in the construction of my time-globe, as seen in Fig. 3, are composed of two plates, *h h′*, united by pillars $a^1$. Between the plates and centrally located is the barrel-wheel H, containing the mainspring *b′*, which imparts motion to the train of wheels and pinions, said motion being regulated by a "patent-lever" or any other escapement adapted to operate with the works in different positions.

The arbor F′ of the barrel-wheel is made of suitable length to extend through the plate *h′*, and also through the meridian-ring C, and receive at its outer end the thumb-piece G, by means of which the mainspring *b′* may be wound up from without the globe without either detaching the sections of the latter or the employment of a separate key.

The ratchet-wheel *n* is secured to the arbor below the plate *h′*.

Upon the plate *h* and coincident with the barrel-wheel arbor is secured by screws the flanged end *c′* of the arbor F. This arbor is also secured by screws, or otherwise, to the meridian-circle C, thus rendering the works of the chronometer stationary relatively to the globe. On and around this arbor F are two wheels, *i* and *j*, receiving their motions from the double wheel *k*, and these are so calculated as to make the wheel *j* revolve once in two hours, being the one hundred and twenty minutes of the dial D, and the wheel *i* one revolution in twenty-four hours, their respective motions being transmitted by prolongations of their arbors *p o* to the globe A and the two hands *b* and *d* of the dial D, the said hands being secured by hard friction to the upper ends of their respective arbors. A slight alteration in the number of teeth of these wheels would, of course, be necessary in case of making the dial D with twelve instead of twenty-four hours. The two hemispherical sections of the globe A are of equal weight, to render the rotative motion of the globe regular, and these sections are connected by means of an inside band, *l*, secured to one of them, and over which the other is placed and held in position by means of four (more or less) small screws.

A hole is made in the globe at one of its poles of a size proper for the accommodation of the portion F′ of the axial shaft, upon which the said globe revolves, while at the other pole of the globe is an aperture, within which fits and is secured the end of the arbor *o* of daily-wheel *i*, which imparts the necessary motion to the globe. The end of this arbor *o* and the hole in the globe within which it is fitted should be made square, or such other form as will insure the rotation of the globe by the arbor. The globe is prevented from sliding on the axial shaft by means of two rings, *m m′*, placed, as shown, one within and one without the globe on F′, and secured to the latter by set-screws.

Having thus described the different parts of the machine, I will now proceed to explain its operation.

Supposing the globe to be stationary, by turning the thumb-piece G, attached to arbor F′, the mainspring *b′* is wound up and motion is imparted to the works, and through the arbor *o* of daily-wheel *i* to the globe, this arbor carrying the hour-hand, which indicates the hour on dial D, while the minute-hand on the arbor *p* indicates the minutes on the same dial. The globe is thus revolved diurnally by the arbor *o*.

To ascertain the time of day at any part of the globe—say Washington city—observe where its meridian meets or crosses the inner circumference of the equatorial dial B, (which is also divided into hours and fractions of the same,) and the time at any such place and at all such places on its meridian will be readily observed.

It will thus be seen that my time-globe not only illustrates the diurnal revolution of the earth on its axis, causing the vicissitude of day and night, and shows the true times respectively of places located on different meridians, but also, by means of the additional dial D, renders the services of a common clock.

If it be desirable to attach a regulator operating from the outside of the clock, this can be easily done, as illustrated at Fig. 4, and is effected by placing a sleeve, *q*, concentric to the arbor F′, at one end of which is a toothed sector, *r*, which engages with another, *s*, adjusted on the balanced-wheel bridge, and bearing the pins which control the hair-spring.

It will be seen that by turning the sleeve *q* the tooth-sector *r* will impart motion to the regulating-sector *s* to produce the desired effect.

Having thus described the construction and operation of my improved time-globe, what I claim therein as new, and desire to secure by Letters Patent, is—

1. The combination, with a globe rotated in any suitable manner and a stationary equatorial dial, of a supplemental stationary dial provided with suitable hands, substantially as and for the purposes described.

2. In combination with the globe, an axial shaft made in two parts, F and F′, the former serving as an axis for the hollow arbors *o* and *p*, which carry the globe and the hands *d* and *b*, and the latter serving as a winding-arbor, all substantially as set forth.

In testimony whereof I have hereunto set my hand and seal this 28th day of February, 1879.

L. P. JUVET. [L. S.]

In presence of—
A. R. CARPENTER,
JOHN E. PARRY.